July 17, 1951  E. S. THOMPSON  2,560,908
HITCH

Filed July 21, 1947  2 Sheets-Sheet 1

INVENTOR.
E. S. Thompson
BY
ATTYS

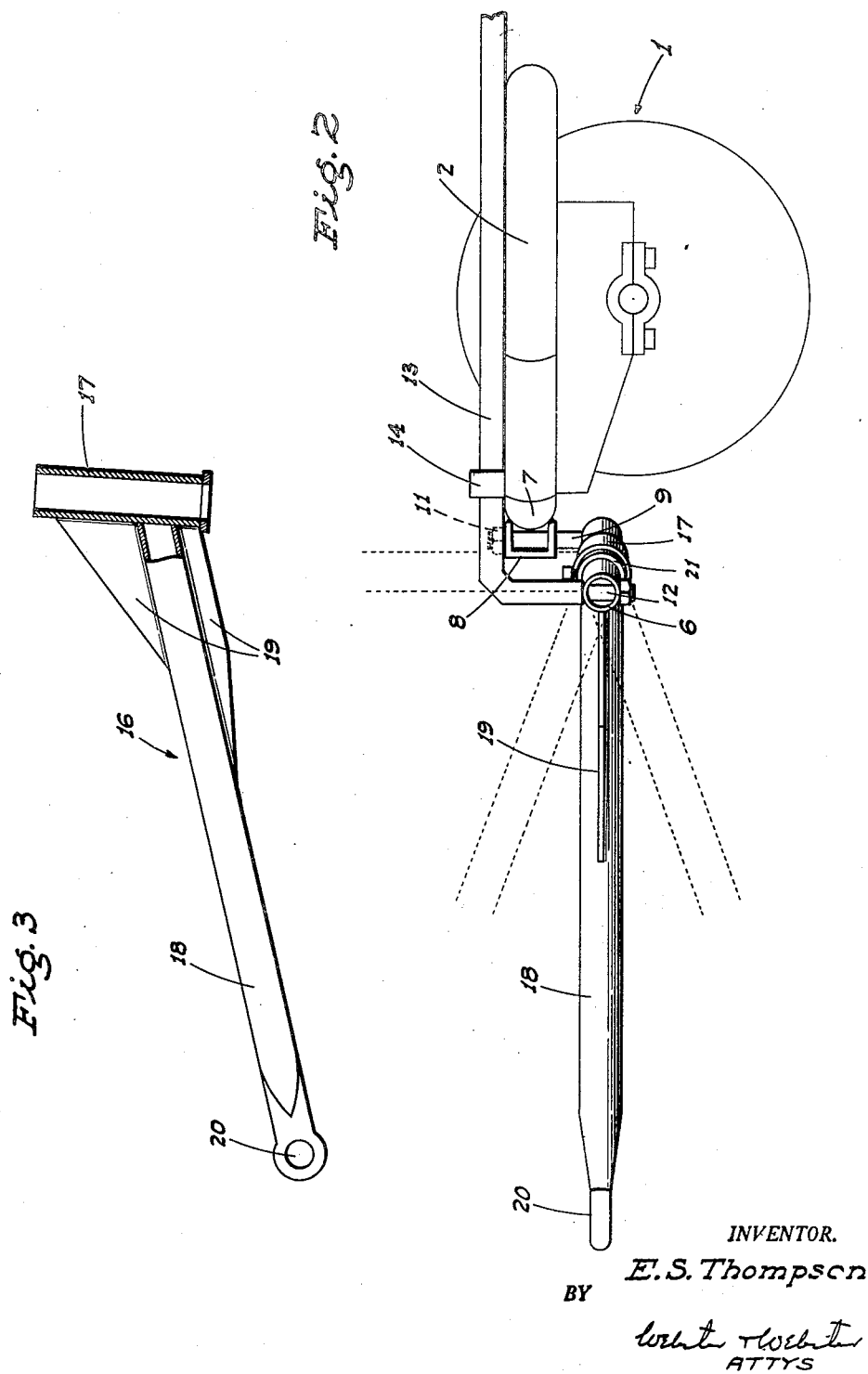

Patented July 17, 1951

2,560,908

UNITED STATES PATENT OFFICE 2,560,908

HITCH

Ernest S. Thompson, Tulare, Calif.

Application July 21, 1947, Serial No. 762,370

1 Claim. (Cl. 280—33.1)

This invention is directed to, and it is an object to provide, an improved hitch for coupling an agricultural implement to a tractor in draft relation; the hitch being especially designed for use with an offset disc harrow.

In order to meet different requirements in the field, it is desirable that a hitch for a disc harrow be arranged so that such implement may be set to run at any position from a right-hand offset position, through a central position, to a left-hand offset position; the present invention providing such a hitch, and one which is arranged whereby the adjustment can be accomplished positively, readily, and easily.

An additional object of the invention is to provide a hitch, as in the preceding paragraph, which includes a tongue, a cross bar, and means to adjustably and reversibly mount the tongue on the cross bar at selective points therealong; the tongue angling forwardly in a transverse horizontal plane whereby reversing of the tongue alters the direction of angularity and consequently changes the direction of offset of the trailing implement relative to the tractor.

It is also an object of the instant invention to provide a hitch which is strong and rugged, yet light to handle, and permits of short turning of the tractor without catching of the tractor wheels or tracks on the single pole or tongue which the hitch includes.

A still further object is to provide a hitch which is simple, economical to manufacture, and easy to adjust, and yet one which will be exceedingly effective for the purpose for which it is designed.

These objects are accomplished by means of such structure and relative arrangement of parts as will fully appear by a perusal of the following specification and claim.

In the drawings:

Fig. 2 is a side elevation of the hitch as mounted on the harrow.

Fig. 3 is a plan view, partly in section, of the tongue unit, detached.

Figure 1:
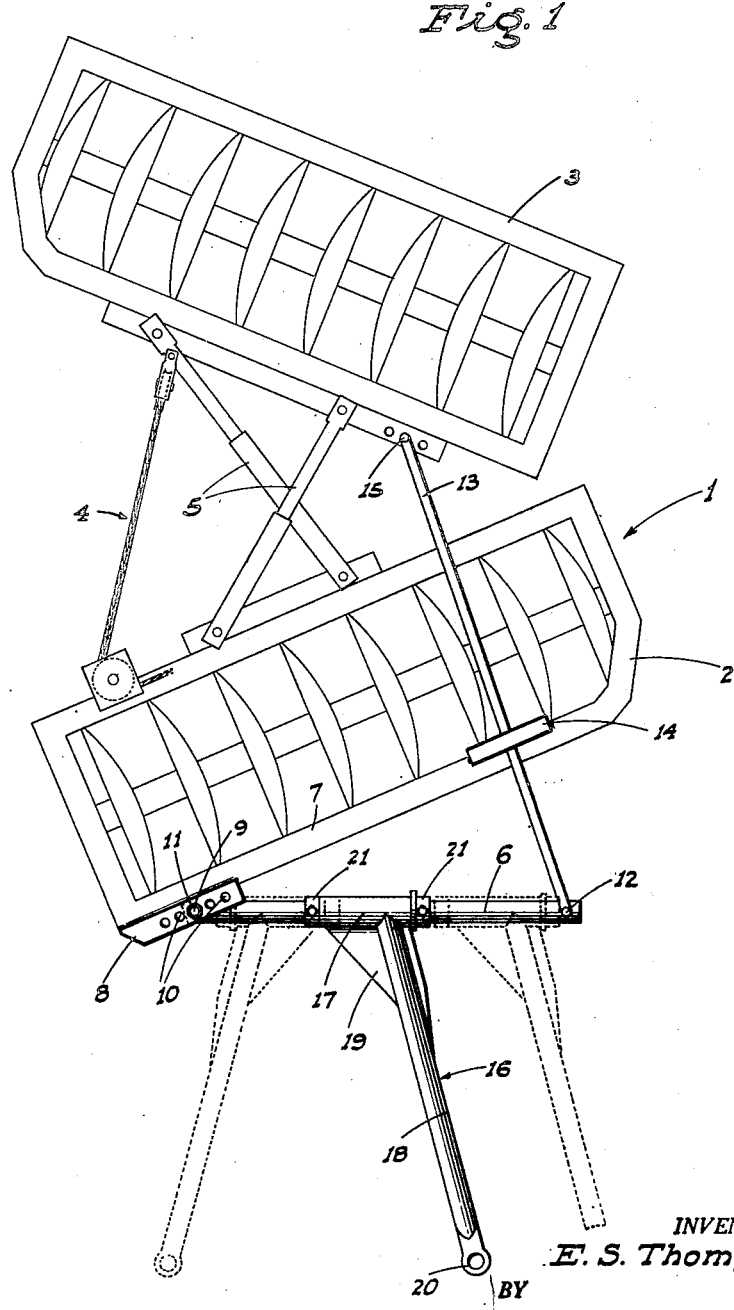
Fig. 1 is a plan view of the hitch as arranged in connection with a tandem disc harrow.

Referring now more particularly to the characters of reference on the drawings, the hitch is here shown as used in connection with a tandem disc harrow, indicating generally at 1, which includes a front gang 2 and a rear gang 3 connected together by means including an angle control mechanism 4 and a linkage assembly 5.

The hitch, which is the subject of the present invention, comprises a tubular cross bar 6 disposed ahead of the front gang 2 in transversely extending relation to the direction of travel, and somewhat below and mainly ahead of the front cross beam 7 of said front gang 2.

At one end the front beam 7 of the front gang 2 is fitted with an attachment bracket 8 which is fixed on, and extends lengthwise of, said beam 7. The attachment bracket 8 is of channel configuration, and a vertical spindle 9 is adjustable therealong by means of a row of holes 10 through which said spindle is selectively engageable; the spindle being retained in place by a nut 11.

At its lower end the spindle is fixed in connection with the tubular cross bar 6, whereby said cross bar is mounted for swinging motion in a horizontal plane relative to the front gang 2.

At the end opposite the attachment bracket 8, the tubular cross bar 6 is attached, pivotally, as at 12, to a draft link 13 which slides through a guide 14 and thence extends rearwardly to adjustable pivotal connection, as at 15, with the rear gang 3.

The tubular cross bar 6 supports a single pole hitch unit, indicated generally at 16, which unit includes a sleeve 17 from which a rigid tubular tongue 18 projects forwardly in angled relation, in a horizontal transverse plane, to the direction of travel. The tongue is reinforced in its mounting to the sleeve 17 by means of gusset plates or webs 19, and at its forward end said tongue is formed with a coupling eye 20 for attachment to the tractor.

The sleeve 17 is slidably and turnably engaged with a relatively close but easy fit on the tubular cross bar 6, being maintained in any selected position therealong by locating collars 21 releasably secured to said cross bar at opposite ends of the sleeve.

By adjusting the position of the sleeve 17 along the tubular cross bar 6, the extent of offset of the tandem disc harrow 1 can be varied or regulated; the tongue unit 16, in any position of adjustment, being vertically swingable, which provides relative flexibility in a vertical plane between the tractor and the implement, which is a desirable feature when uneven ground is being traversed.

By reason of the particular design of the tongue unit 16, it is reversible on the tubular cross bar 6 to project angularly to right or left, in order to accomplish offsetting of the tandem disc harrow 1 in opposite directions relative to the line of draft, and—as previously explained—the extent of offset may be altered by adjusting the sleeve 17 along the tubular cross bar 6.

Different positions of the tongue unit 16 are illustrated in full lines and broken lines in Fig. 1; a typical working position of the hitch being shown in full lines.

The design of the described hitch is such that its adjustment, to different working positions, can be effected quickly and easily, and in use the hitch is quite strong and rigid; the webbing 19 being disposed close to the sleeve 17, leaving the remainder of the pole or tongue 18 unobstructed. This is advantagtous, as there are no forward braces or the like to engage the tractor wheels or tracks when a short turn is made.

Lateral adjustment of the entire hitch is accomplished by adjustment of the vertical spindle 9 along the attachment bracket 8.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

I claim:

In an offset disc harrow which includes a transversely extending tubular hitch bar detachably connected at its ends to the front of the harrow, a sleeve slidably mounted on the bar, a tongue fixed to the sleeve and projecting outwardly therefrom at an angle to the longitudinal axis of such sleeve, the sleeve being adapted to be detached from the bar and replaced thereon in a reversed position whereby the tongue may be selectively positioned to project angularly to the right or to the left of the harrow, means to hold the sleeve in any selected position along the length of the bar; the tongue being fixed to the sleeve at one end thereof and spaced from the other end, and a brace plate extending diagonally from the tongue to a point adjacent said other end of the sleeve.

ERNEST S. THOMPSON.

REFERENCES CITED

The following references are of record in the file of this patent:

UNITED STATES PATENTS

| Number | Name | Date |
| --- | --- | --- |
| 1,762,919 | Drabek | June 10, 1930 |
| 2,167,768 | Mitchell | Aug. 1, 1939 |
| 2,341,139 | Dyrr | Feb. 8, 1944 |
| 2,406,866 | Thompson | Sept. 3, 1946 |